United States Patent
Muther

(10) Patent No.: US 11,979,109 B2
(45) Date of Patent: May 7, 2024

(54) END CLAMP FOR FIXING A FRAMED PV MODULE

(71) Applicant: AEROCOMPACT HOLDING GMBH, Satteins (AT)

(72) Inventor: Mathias Muther, Roens (AT)

(73) Assignee: Aerocompact Group Holding AG, Vienna (AT)

( * ) Notice: Subject to any disclaimer, the term of this patent is extended or adjusted under 35 U.S.C. 154(b) by 47 days.

(21) Appl. No.: 17/040,585

(22) PCT Filed: Jan. 28, 2020

(86) PCT No.: PCT/EP2020/051969
§ 371 (c)(1),
(2) Date: Sep. 23, 2020

(87) PCT Pub. No.: WO2020/187472
PCT Pub. Date: Sep. 24, 2020

(65) Prior Publication Data
US 2023/0095008 A1    Mar. 30, 2023

(30) Foreign Application Priority Data
Sep. 5, 2019   (WO) ................. PCT/EP2019/073731

(51) Int. Cl.
*B25B 5/00*    (2006.01)
*H02S 30/00*   (2014.01)

(52) U.S. Cl.
CPC .................................. *H02S 30/00* (2013.01)

(58) Field of Classification Search
CPC .... B25B 5/00; B25B 5/02; B25B 5/04; B25B 5/067; B25B 5/082; B25B 5/101; B23P 11/00; B23Q 3/00; B23Q 3/06
See application file for complete search history.

(56) References Cited

U.S. PATENT DOCUMENTS 3,940,228 A * 2/1976 Griffin ................. H01B 13/008
                                                            425/445
9,837,955 B1   12/2017 Schuit et al.
(Continued)

FOREIGN PATENT DOCUMENTS

| CN | 102290465 A | 12/2011 |
|---|---|---|
| EP | 2592365 A2 | 5/2013 |
| WO | 2016145419 A1 | 9/2016 |

OTHER PUBLICATIONS

International search report for patent application No. PCT/EP2020/051969 dated Apr. 27, 2020.
(Continued)

*Primary Examiner* — Lee D Wilson
(74) *Attorney, Agent, or Firm* — Bachman & LaPointe, P.C.

(57) ABSTRACT

An end clamp (01) for fixing a framed PV module (02) on a support profile (03), includes a console element (05) fixed to the support profile (03), and including a clamp strap (04) for holding down the frame (08) of the PV module (02), the clamp strap (04) having at least one clamping surface (07) in contact with the frame (08) of the PV module (02) in a clamping manner. The clamp strap (04) has a supporting surface (17) which contacts a side of a contact surface (20) of the console element (05) while supporting the clamp strap (04). A turnbuckle (06) engages between the clamp strap (04) and the console element (05) for tightening the clamp strap (04) against the console element (05) to hold down the frame (08) of the PV module (02). An least one fixing element (18) is provided at the supporting surface (17) of the clamp strap (04). The fixing element (18) is fixed to a counter fixing element (21) having a complementary shape in a positive and/or frictional manner in the contact surface (20) of the console element (05). An approximation of the supporting surface (17) of the clamp strap (04) towards the (Continued)

support profile (03) is excluded by positive mechanical engagement and/or frictional connection between the fixing element (18) and the counter fixing element (21).

14 Claims, 3 Drawing Sheets

(56) References Cited

U.S. PATENT DOCUMENTS

| | | | |
|---|---|---|---|
| 2011/0260027 A1 | 10/2011 | Farnham, Jr. et al. | |
| 2014/0017031 A1* | 1/2014 | Prichard | F16B 13/0808 |
| | | | 411/204 |
| 2018/0342974 A1* | 11/2018 | Jasmin | F24S 25/636 |
| 2023/0116676 A1* | 4/2023 | Wu | F16B 21/165 |
| | | | 403/321 |

OTHER PUBLICATIONS

Hopergy Ultimate end clamp installation, Paul Chiu, 2018, https://www.youtube.com/watch?v=XCwh81ellAs.

* cited by examiner

END CLAMP FOR FIXING A FRAMED PV MODULE

BACKGROUND OF THE INVENTION

The invention relates to an end clamp for fixing framed PV modules.

From the state of the art, module clamps are known for fixing PV modules on the support profiles of a support structure. Depending on the placing of the module clamps on the PV modules, middle clamps or end clamps are used. The middle clamps serve to be disposed between two adjacent PV modules, the module clamp thus clamping the two PV modules on the frame. End clamps, however, are used on the edge of module fields and serve to fix the frame of one PV module only.

The generic end clamp comprises a console element by means of which the end clamp can be fixed to the support profile of the support structure. The end clamp also comprises a clamp strap by means of which the frame of the PV module is held down. To this end, a clamping surface is provided at the clamp strap, the clamping surface coming into contact with a corresponding surface of the frame of the PV module.

Due to the clamping forces in the clamping surface, considerable torques act on the clamp strap. With respect to middle clamps, said torques are symmetrically introduced and therefore neutralize one another. With respect to end clamps, said symmetrical introduction of the clamping force is not available, the clamp strap thus having an additional supporting surface by means of which the clamp strap can be supported on a side of a contact surface of the console element. In that manner, the torque caused by the clamping force is absorbed and neutralized.

A turnbuckle engages between the clamp strap and the console. The clamp strap can be tensioned against the console by tightening the turnbuckle in order to press the frame of the PV module against the support profile and thus to fix it.

A disadvantage of the known end clamps is that essentially only a normal force can be applied to the frame of the PV module by means of the generic end clamps, said frame being directed in parallel with the longitudinal axis of the turnbuckle. Said normal force applied by the known end clamps presses the frame of the PV module exclusively from above against the support profile. A force which acts from a side on the frame of the PV module and by means of which the frame is pressed in parallel with the support profile against the opposite module clamps cannot be applied by the known end clamps. In this respect, a precise orientation of the PV module must be carried out by hand before the turnbuckles are tensioned.

SUMMARY OF THE INVENTION

Starting from the aforementioned state of the art, the object of the present invention is to indicate a new end clamp which avoids the disadvantages described above.

Said object is attained by an end clamp as disclosed herein.

Advantageous embodiments of the invention are also disclosed herein.

At least one fixing element is provided at the supporting surface of the clamp strap according to the invention, wherein the fixing element can be fixed to a counter fixing element which has a complementary shape in a positive and/or frictional manner in the contact surface of the console element. The positive mechanical engagement or frictional connection between the fixing element and the counter fixing element ensures that an approximation of the supporting surface of the clamp strap towards the support profile is excluded. In other words, it is no longer possible to shift the fixing strap towards the support strap when the positive mechanical engagement or frictional connection between the fixing elements and the counter fixing elements is established. During the assembly, the clamp strap is therefore loosely placed on the frame of the PV module in the first place, the locking elements being placed on the counter locking elements without substantial proof. When the screw is then tightened, the support strap can slide towards the support profile until a positive mechanical engagement or frictional connection excluding the additional displacement is established between the fixing elements and the counter fixing elements due to the increasing proof. When the positive mechanical engagement or frictional connection between the fixing elements and the counter fixing elements is established, the support strap can no longer slide towards the support profile, a pitching moment thus acting on the clamp strap. Said pitching moment depends on the amount of tension of the turnbuckle and pulls the clamp strap transversely to the clamping force applied in the clamping surface in the direction of the frame of the PV module. As a result, a clamping force acting in parallel with the longitudinal axis of the turnbuckle and a lateral thrust acting perpendicularly thereto can be applied when the turnbuckle is tightened. By said thrust, the PV module is shifted in parallel with the support profile until any play in the horizontal direction in parallel with the support profile is removed.

Depending on the specific design, the frames of the PV modules can have different heights. PV modules which have a height in the range between 20 mm and 50 mm are known. In order to be able to fix PV modules which have different heights by means of identical end clamps, the number of the counter fixing elements in the contact surface of the console element is preferably higher than the number of the fixing elements at the supporting surface of the clamp strap. In this way, the clamp strap can engage in different positons at the console element when the end clamp is assembled in order to compensate for the different heights of the frame of the PV modules.

The specific design of the fixing elements and the counter fixing elements is generally arbitrary. According to a preferred embodiment, the fixing elements and counter fixing elements are realized in the manner of a gearing which has a complementary shape. Such gearings can be realized without any problems when aluminum profile bodies are produced, the clamp straps or console elements normally being made of said aluminum profile bodies.

With respect to the fixation of the clamp strap at the console element by means of a positive mechanical engagement and/or frictional connection without establishing a positive connection, the gearing preferably projects at angle from the supporting surface of the clamp strap and the free ends of the gearing point towards the clamping surface at the clamp strap. The clamp strap is therefore fixed between the fixing elements and the counter fixing elements at the console element only if a correspondingly high proof is applied. However, if no or only a low proof is applied between the fixing elements and the counter fixing elements, the clamp strap can be shifted relative to the console element without any problems.

When the turnbuckle is tightened, a pitching moment acts on the clamp strap of the end clamp according to the invention, said pitching moment pushing the clamp strap towards the frame of the PV module. In order to effect a lateral force on the frame of the PV module by said pitching moment, the clamping surface of the clamp strap preferably comprises two clamping surface sections which extend perpendicularly to one another and which can grip a corner edge of the support profile. The clamping force acting in the direction of the longitudinal axis of the turnbuckle can then be applied to the upper side of the frame by means of the first clamping surface section, while the thrust acting in a lateral manner on the frame of the PV module is applied by means of the second clamping surface section.

In order to allow for an at least slight tilting movement of the clamp strap when the turnbuckle is tightened, the supporting surface preferably has a protrusion in relation to the inside of the clamp strap which points to the turnbuckle. By said protrusion, a free punch is realized on the inside of the clamp strap, the desired slight tilting movement of the clamp strap relative to the console element thus not being blocked.

The specific fixation of the console element at the support profile is generally arbitrary. According to an embodiment to be produced in a particularly simple manner, the console element comprises two expanding hooks which are hinged in an elastic manner and which can be fixed in a recess of the support profile. To this end, the expanding hooks each have a hook element which can engage behind the edge of the recess in a fixing manner. When the console element is assembled at the support profile, the expanding hooks are inserted from above into the recess of the support profile and spring in an elastic manner. As soon as the hook elements engage behind the wall at the edge of the support profile, the expanding hooks spring back in an elastic manner and thus fix the console element at the support profile. If the console element is to be disassembled, the two expanding hooks can be pressed together in an elastic manner in order to loosen the rear grip of the hook elements on the edge of the recess.

In order to prevent an undesired removal of the expanding hooks of the console element from the support profile, a preferred embodiment provides to realize a gap between the two expanding hooks, the turnbuckle being inserted into said gap when the end clamp is tightened. At least one blocking bar is formed on the inside of the expanding hooks which points towards the turnbuckle. A free end of the blocking bars opposite to one another can come into contact with the thread of the turnbuckle after screwing the turnbuckle into the gap. By said contact of the blocking bars with the turnbuckle, the pressing together of the expanding hooks is blocked and an undesired disassembly of the console element from the support profile is therefore excluded.

Additionally, the diameter of the thread of the turnbuckle is preferably slightly larger than the distance between the free ends of the opposite blocking bars. Due to the slightly larger diameter of the thread, the blocking bars can therefore be at least slightly pushed apart when the turnbuckle is screwed and the hook elements can thus be secured when they engage behind the edge of the recess in the support profile.

The design of the clamps straps is generally arbitrary. The clamping surface of the clamp strap is disposed at the first strap arm, while the supporting surface is disposed at the second strap arm.

In order to support the tilting of the clamp strap in the lateral direction against the frame of the PV module, the intermediate angle between the two strap arms of the clamp strap is preferably smaller or larger than 90 degrees. The pitching of the clamp strap is supported by said angle variation compared to the right angle. The intermediate angle between the two strap arms is preferably in the range between 89 degrees and 85 degrees or in the range between 91 degrees and 95 degrees.

In order to avoid an electrostatic charge of the PV modules, a regular grounding of the frame must be provided. Said grounding can be realized in a simple manner by providing a grounding element at the clamp strap of the end clamp by means of which an electrically conductive contact can be established between the clamp strap and the frame of the PV module. An electrically conductive contact can thus be established between the support profile of the support structure and the frame of the PV module by installing an end clamp.

The specific design of the grounding element is generally arbitrary. The grounding element can be realized in a particularly simple and cost-efficient manner if it is realized in the manner of a contact screw whose end opposite to the screw head has a tip. By screwing the contact screw, said tip can be pushed in the surface of the frame of the PV module and a reliable electrical contact can thus be established.

The tip of the contact screw is preferably disposed in the clamping surface of the clamp strap. In the clamping surface, a contact of the clamp strap with the frame of the PV module is ensured without any significant play and the tip of the contact screw can thus be pushed in the surface of the frame of the PV module without any problems.

BRIEF DESCRIPTION OF THE DRAWINGS

An embodiment of the end clamp according to the invention is represented in a schematized manner in the drawings and is described below in an exemplary manner.

In the following.

DETAILED DESCRIPTION

Figure 1:
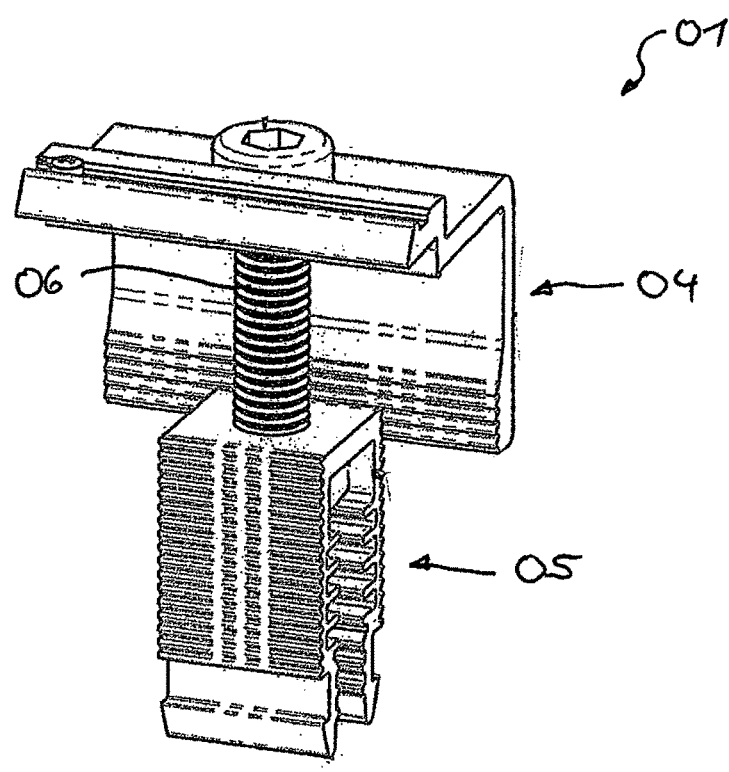
FIG. 1 shows an end clamp according to the invention in a perspective lateral view.

FIG. 1 shows an end clamp 01 for fixing a framed PV module 02 (see FIG. 3) at a support profile 03 (see FIG. 3) in a perspective view. End clamp 01 comprises a clamp strap 04 and a console element 05. A turnbuckle 06 engages between clamp strap 04 and console element 05 in order to be able to tighten clamp strap 04 against console element 05.

Figure 2:
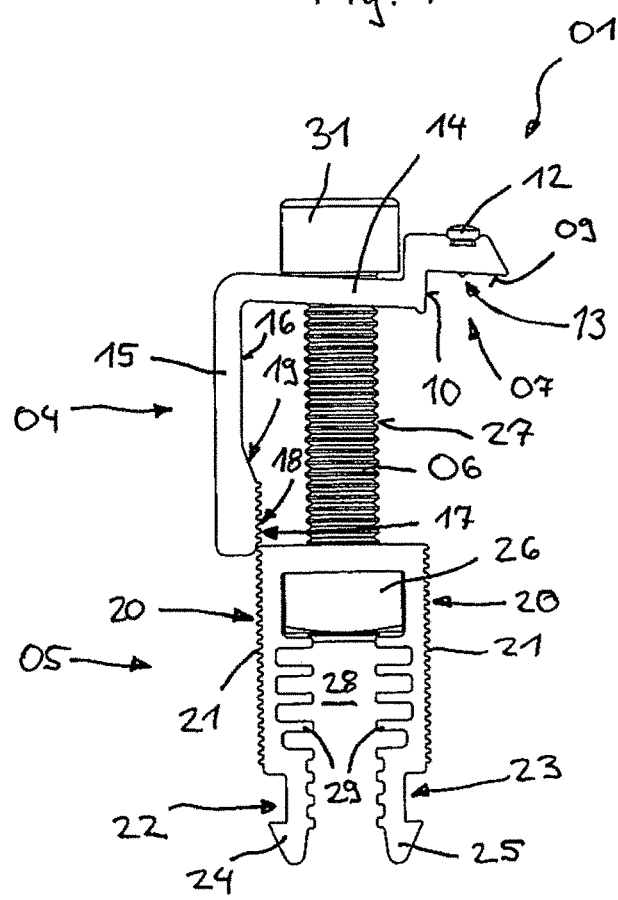
FIG. 2 shows the end clamp according to FIG. 1 in a lateral view.

FIG. 2 shows end clamp 01 in a lateral view. A clamping surface 07 is provided at clamp strap 04, wherein clamping surface 07 can come into contact with frame 08 (see FIG. 3) of PV module 02 in a clamping manner. Clamping surface 07 comprises two clamping surface sections 09 and 10 which are disposed perpendicularly to one another. Clamping surface 07 can thus grip a corner edge 11 (see FIG. 3) of frame 08.

Additionally, a contact screw 12 is provided at clamp strap 04, wherein contact screw 12 is used as a grounding element and an electrical contact can be established between clamp strap 04 and frame 08 of PV module 02 by means of contact screw 12. Contact screw 12 passes through the wall of clamp strap 04 and has a tip 13 at the end which points to frame 08, wherein tip 13 can be pushed in the surface of frame 08 by screwing contact screw 12.

With respect to the design, clamp strap 04 comprises two strap arms 14 and 15 which extend at angle to one another. Strap arms 14 and 15 have an intermediate angle which is smaller than 90 degrees, for example an intermediate angle of 87 degrees. By said slight angle variation compared to the right angle, the tilting of strap arm 04 towards frame 08 is supported.

At the lower end of strap arm 15, a supporting surface 17 is provided on inside 16 of strap arm 04, several fixing elements 18 being formed on said supporting surface 17. Supporting surface 17 has a slight protrusion 19 in relation to inside 16 in order to allow for at least a slight tilting movement of clamp strap 04. A contact surface 20 is provided on two sides of C-shaped console element 05, wherein supporting surface 17 of clamp strap 04 can come into contact with contact surface 20 in a supporting manner. Counter fixing elements 21 are formed on clamping surfaces 20. Fixing elements 18 and counter fixing elements 21 can come into contact with one another by means of a positive mechanical engagement and/or a frictional connection; said fact will be explained below with the aid of the representation in FIG. 3.

Console element 05 also comprises two expanding hooks 22 and 23 which are each hinged in an elastic manner. A hook element 24 or 25 is provided is on each of the two expanding hooks 22 and 23 by means of which console element 05 can be fixed to support profile 03. Said fact is also described below with the aid of the representation in FIG. 3.

A nut 26 is gripped in a positive manner between expanding hooks 22 and 23, wherein thread 27 of turnbuckle 06 can be screwed into nut 26 to tighten end clamp 01. A gap 28 is realized between expanding hooks 22 and 23, gap 28 receiving turnbuckle 06 after screwing turnbuckle 06 into nut 26. Several blocking bars 29 are provided on the inside of expanding hooks 22 and 23 which points to turnbuckle 06, wherein the free end of blocking bars 29 can come into contact with thread 27 of turnbuckle 06 after screwing turnbuckle 06 into nut 26. A pressing together of expanding hooks 22 and 23 after screwing turnbuckle 06 into nut 26 can thus be blocked.

Figure 3:
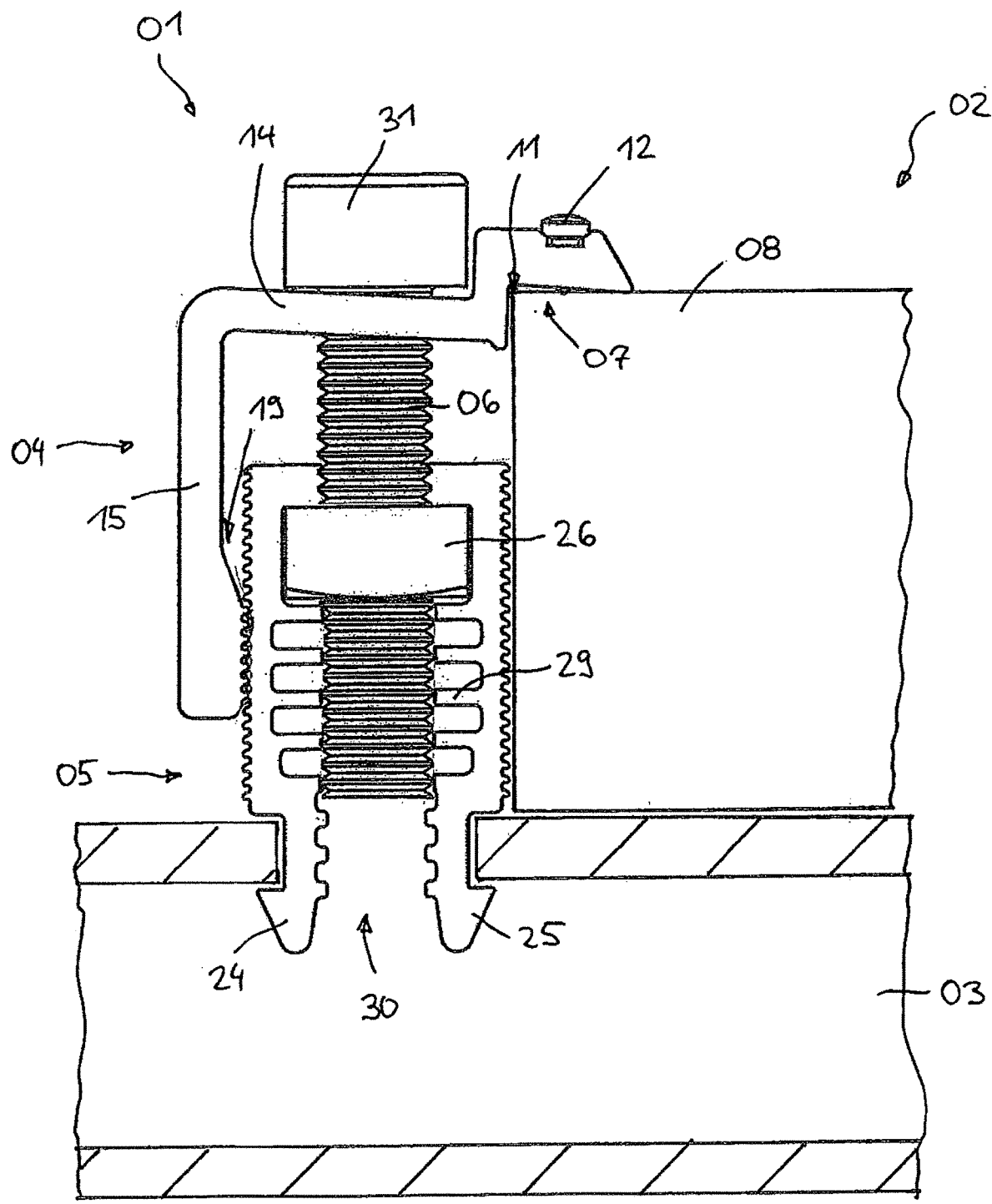
FIG. 3 shows the end clamp according to FIG. 2 after assembling a PV module at a support profile in a lateral view.

FIG. 3 shows end clamp 01 after fixing console element 05 to support profile 03 and after assembling frame 08 of a PV module 02 by tightening end clamp 01. Hook elements 24 and 25 engage behind the edge of a recess 30 in support profile 03 and thus fix console element 05 to support profile 03. A temporary securing of the position is realized by an elastic spring-back of expanding hooks 22 and 23. When turnbuckle 06, whose thread 27 has a larger diameter than the distance between the free ends of blocking bars 29, is screwed into gap 28, blocking bars 29 are slightly pressed in an outward direction and a pressing together of expanding hooks 22 and 23 is excluded in a reliable manner.

In order to fix frame 08 of PV module 02 to support profile 03, the two clamping surface sections 09 and 10 of clamp strap 04 initially contact the area of corner edge 11 of frame 08, and locking elements 18 are locked at counter locking elements 21 in the corresponding position. After the first locking of counter locking elements 21 at locking elements 18, clamp strap 04 and its strap arm 15 can slide towards support profile 03. When turnbuckle 06 is screwed further and end clamp 01 is therefore tightened, a normal force is applied from above to frame 08 in clamping surface section 09, the normal force pressing frame 08 against support profile 03 and fixing frame 08 in a corresponding manner.

Additionally, a pitching moment acts on clamp strap 04 by the fixation of the lower end of strap arm 15 and the simultaneous tightening of turnbuckle 06, clamping surface section 10 of clamp strap 04 thus pressing in a lateral direction against frame 08.

Furthermore, FIG. 3 shows that locking elements 18 at clamp strap 04 and counter locking elements 21 at console element 05 are each realized in the form of a gearing. Both gearings have a complementary shape, the gearing thus being able to engage into one another. The free ends of the gearing at supporting surface 17 point towards clamping surface 03, a positive mechanical engagement between clamp strap 04 and console element 05 thus being excluded when a force is applied in the direction of support profile 03. Due to the angular disposition, locking elements 18 and counter locking elements 21 can be displaced in relation to one another without any problems as long as the proof of supporting surface 17 against contact surface 20 is below a defined surface pressure. As soon as the clamping surface is tightened against frame 08 of the PV module, the thrust of supporting surface 17 against contact surface 20 exceeds said threshold value. From that moment, fixing elements 18 are fixed to counter fixing elements 21 in a positive and frictional manner in contact surface 20 of console element 05.

Due to the fact that contact surfaces 20 including counter locking elements 21 are provided at expanding hook 22 and at expanding hook 23, the console element can be fixed to support profile 03 in both possible directions of assembly.

As soon as clamp strap 04 is sufficiently tightened against frame 08 and PV module 02 is thus fixed to support profile 03, contact screw 12 can be screwed and tip 13 can therefore be pushed in the surface of frame 08. A reliable grounding contact is therefore realized between frame 08 and end clamp 01.

Figure 4:
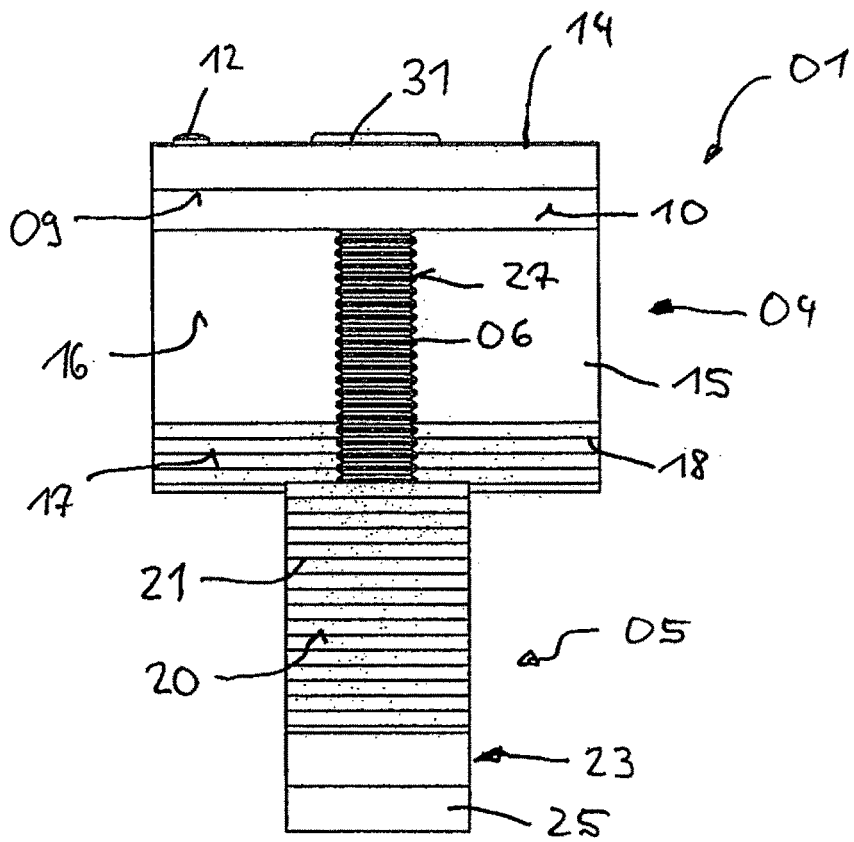
FIG. 4 shows the end clamp according to FIG. 1 in a second lateral view.

FIG. 4 shows end clamp 01 in a lateral view. It can be seen that the number of locking elements 18 in supporting surface 17 of clamp strap 04 is lower than the number of counter locking elements 21 in contact surface 20 of the console element. Different PV modules comprising frames 08 of different heights can therefore be fixed by means of end clamp 01. Depending on the height of frame 08, clamp strap 4 can be locked in different heights at console element 05 and the fixation can therefore satisfy the requirements.

Figure 5:
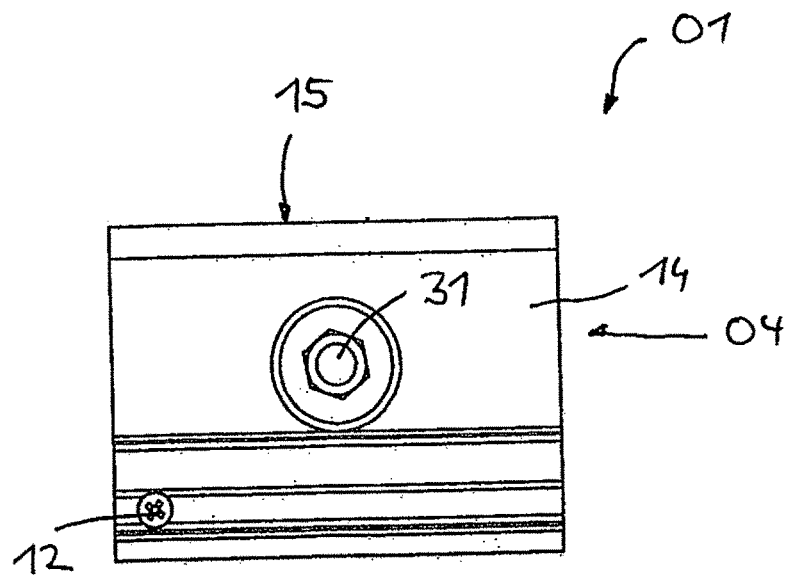
FIG. 5 shows the end clamp according to FIG. 1 in a view from above.

FIG. 5 shows end clamp 01 and screw head 31 of turnbuckle 06 and contact screw 12 in a view from above.

REFERENCE SIGNS 01 end clamp
02 PV module
03 support profile
04 clamp strap
05 console element
06 turnbuckle
07 clamping surface
08 frame
09 clamping surface section
10 clamping surface section
11 corner edge
12 contact screw
13 tip
14 strap arm
15 strap arm
16 inside
17 supporting surface
18 fixing element 19 protrusion
20 contact surface
21 counter fixing element
22 expanding hook
23 expanding hook
24 hook element
25 hook element
26 nut
27 thread
28 gap
29 blocking bar
30 recess
31 screw head

The invention claimed is:

1. An end clamp (01) for fixing a framed PV module (02) on a support profile (03), comprising a console element (05) which can be fixed to the support profile (03), and comprising a clamp strap (04) for holding down the frame (08) of the PV module (02), the clamp strap (04) having at least one clamping surface (07) which can come into contact with the frame (08) of the PV module (02) in a clamping manner, and the clamp strap (04) having a supporting surface (17) which can come into contact with a side of a contact surface (20) of the console element (05) while supporting the clamp strap (04), and a turnbuckle (06) which engages between the clamp strap (04) and the console element (05) and by means of which the clamp strap (04) can be tightened against the console element (05) to hold down the frame (08) of the PV module (02),
wherein
at least one fixing element (18) is provided at the supporting surface (17) of the clamp strap (04), wherein the fixing element (18) can be fixed to a counter fixing element (21) which has a complementary shape in at least one of a positive or frictional manner in the contact surface (20) of the console element (05), an approximation of the supporting surface (17) of the clamp strap (04) towards the support profile (03) being excluded by at least one of the positive mechanical engagement or frictional connection between the fixing element (18) and the counter fixing element (21), wherein the console element (05) comprises two expanding hooks (22, 23) which are hinged in an elastic manner and which can be fixed in a recess (30) of the support profile (03), wherein the expanding hooks (22, 23) each have a hook element (24, 25) which can engage behind the edge of the recess (30) in a fixing manner, and wherein the two expanding hooks (22, 23) can converge in an elastic manner in order to loosen the rear grip of the hook elements (24, 25) on the edge of the recess (30).

2. The end clamp according to claim 1, wherein the number of counter fixing elements (21) in the contact surface (20) of the console element (05) is higher than the number of fixing elements (18) at the supporting surface (17) of the clamp strap (04).

3. The end clamp according to claim 1, wherein the fixing elements (18) and the counter fixing elements (21) are realized in the manner of a gearing which has a complementary shape.

4. The end clamp according to claim 3, wherein the gearing projects at angle from the supporting surface (17) of the clamp strap (04) and the free ends of the gearing point towards the clamping surface (07).

5. The end clamp according to claim 1, wherein the clamping surface (07) of the clamp strap (04) comprises two clamping surface sections (09, 10) which extend perpendicularly to one another and which can grip a corner edge (11) of the frame (08) of the PV module (02).

6. The end clamp according to claim 1, wherein the supporting surface (17) has a protrusion (19) in relation to the inside (16) of the clamp strap (04) which points to the turnbuckle (06).

7. The end clamp according to claim 1, wherein a gap (28) is realized between the two expanding hooks (22, 23), the turnbuckle (06) being inserted into said gap (28) when the end clamp (01) is tightened, wherein at least one blocking bar (29) is formed on the inside of the expanding hooks (22, 23) pointing towards the turnbuckle (06), wherein a free end can come into contact with the thread (27) of the turnbuckle (06) and therefore block an elastic approximation of the expanding hooks (22, 23).

8. The end clamp according to claim 7, wherein the diameter of the thread (27) of the turnbuckle (06) is slightly larger than the distance between the free ends of the opposite blocking bars (29).

9. The end clamp according to claim 1, wherein the clamp strap (04) comprises two strap arms (14, 15) which extend at angle to one another, the clamping surface (07) being disposed at the first strap arm (14) and the supporting surface (17) being disposed at the second strap arm (15).

10. The end clamp according to claim 9, wherein the intermediate angle between the two strap arms (14, 15) is smaller or larger than 90 degrees.

11. The end clamp according to claim 10, wherein the intermediate angle between the two strap arms (14, 15) is in the range between 89 degrees and 85 degrees or in the range between 91 degrees and 95 degrees.

12. The end clamp according to claim 1, wherein a grounding element is provided at the clamp strap (04) by means of which an electrically conductive contact between the clamp strap (04) and the frame (08) of the PV module (02) can be established.

13. The end clamp according to claim 12, wherein the grounding element is realized in the manner of a contact screw (12) whose free end opposite to the screw head has a tip (13) which can be pushed in the surface of the frame (08) of the PV module (02).

14. The end clamp according to claim 13, wherein the tip (13) of the contact screw (12) is disposed in the clamping surface (07) of the clamp strap (04).

* * * * *